(12) United States Patent
Takahashi et al.

(10) Patent No.: US 7,088,889 B2
(45) Date of Patent: Aug. 8, 2006

(54) OPTICAL SPLITTER

(75) Inventors: Fumio Takahashi, Yokohama (JP); Takeshi Narita, Yokohama (JP)

(73) Assignee: NHK Spring Co., LTD, Kanagawa (JP)

( * ) Notice: Subject to any disclaimer, the term of this patent is extended or adjusted under 35 U.S.C. 154(b) by 0 days.

(21) Appl. No.: 10/951,423

(22) Filed: Sep. 28, 2004

(65) Prior Publication Data

US 2005/0041925 A1    Feb. 24, 2005

Related U.S. Application Data

(63) Continuation of application No. PCT/JP03/03999, filed on Mar. 28, 2003.

(30) Foreign Application Priority Data

Mar. 29, 2002  (JP) ............................. 2002-097611

(51) Int. Cl.
*G02B 6/26* (2006.01)
*G02B 6/42* (2006.01)

(52) U.S. Cl. ............................. 385/43; 385/27; 385/31; 385/39; 385/45; 385/50

(58) Field of Classification Search ............ 385/14–15, 385/27–31, 39, 42–46, 48, 50, 129–132, 385/43
See application file for complete search history.

(56) References Cited

U.S. PATENT DOCUMENTS

| | | | |
|---|---|---|---|
| 5,285,507 A | * | 2/1994 | Van der Tol ................. 385/11 |
| 5,305,412 A | * | 4/1994 | Paoli ......................... 385/122 |
| 5,418,867 A | * | 5/1995 | Van Der Tol ................ 385/11 |
| 5,463,705 A | * | 10/1995 | Clauberg et al. ............ 385/14 |
| 5,490,226 A | * | 2/1996 | Nelson ....................... 385/16 |
| 5,524,156 A | * | 6/1996 | Van Der Tol ................ 385/28 |
| 5,586,209 A | * | 12/1996 | Matsuura et al. ........... 385/45 |
| 5,627,928 A | * | 5/1997 | Matsuura et al. ........... 385/45 |
| 5,664,038 A | * | 9/1997 | Okushima ................... 385/50 |
| 5,745,619 A | * | 4/1998 | Li et al. ...................... 385/48 |
| 5,757,995 A | * | 5/1998 | Chen et al. ................. 385/45 |
| 6,236,784 B1 | * | 5/2001 | Ido ............................. 385/45 |

(Continued)

FOREIGN PATENT DOCUMENTS

EP    0 811 860    10/1997

(Continued)

OTHER PUBLICATIONS

"Novel Optical Single-Mode Asymmetric Y-Branches for Variable Power Splitting", Lin et al, IEEE Journal of Quantum Electronics, vol. 35, No. 7, Jul. 1999.*

(Continued)

*Primary Examiner*—Frank G. Font
*Assistant Examiner*—Ryan Lepisto
(74) *Attorney, Agent, or Firm*—Ohlandt, Greeley, Ruggiero & Perle, L.L.P.

(57) ABSTRACT

An optical splitter includes a main waveguide, a tapered waveguide, and a split waveguide group having first and second split waveguides. The side portions of the tapered waveguide taper and expand from a first end portion toward second end portions. The widths of the split waveguides differ from each other. The whole width of the split waveguide group at connecting portions between the tapered waveguide and the split waveguides is smaller than the width of the tapered waveguide at the second end portions. Step portions are formed between the split waveguide group and the side portions.

6 Claims, 9 Drawing Sheets

U.S. PATENT DOCUMENTS

| | | | |
|---|---|---|---|
| 6,289,147 B1 * | 9/2001 | Bulthuis et al. | 385/24 |
| 6,463,188 B1 * | 10/2002 | Takahashi et al. | 385/14 |
| 6,542,670 B1 * | 4/2003 | Takahashi et al. | 385/45 |
| 6,643,432 B1 * | 11/2003 | Bouda | 385/43 |
| 6,768,758 B1 * | 7/2004 | Hamamoto | 372/46 |
| 6,823,118 B1 * | 11/2004 | Hanashima | 385/43 |
| 2003/0016914 A1 * | 1/2003 | Kim | 385/45 |

FOREIGN PATENT DOCUMENTS

| | | |
|---|---|---|
| JP | 09-080244 | 3/1997 |
| JP | 10-73735 | 3/1998 |
| JP | 2000-660455 | 3/2000 |

OTHER PUBLICATIONS

Information sheet with Statement of Relevance dated Sep. 17, 2004.

International Search Report from PCT/JP03/03999 dated Jun. 10, 2003.

\* cited by examiner

PRIOR ART

FIG. 14

PRIOR ART

FIG. 15

PRIOR ART

FIG. 16

PRIOR ART

FIG. 17

OPTICAL SPLITTER

CROSS REFERENCE TO RELATED APPLICATIONS

This is a Continuation Application of PCT Application No. PCT/JP03/03999, filed Mar. 28, 2003, which was published under PCT Article 21(2) in Japanese.

This application is based upon and claims the benefit of priority from prior Japanese Patent Application No. 2002-097611, filed Mar. 29, 2002, the entire contents of which are incorporated herein by reference.

BACKGROUND OF THE INVENTION

1. Field of the Invention

This invention relates to an optical splitter that is applied to, for example, a device for splitting a signal light beam in optical communications and the like.

2. Description of the Related Art

For example, in a device for optical integrated circuits used for optical communications, a so-called Y-split waveguide is known as one means for splitting a signal light beam. A splitter capable of asymmetrically splitting optical power at a ratio of 60 to 40 or a ratio of 90 to 10 is also demanded.

Figure 14:
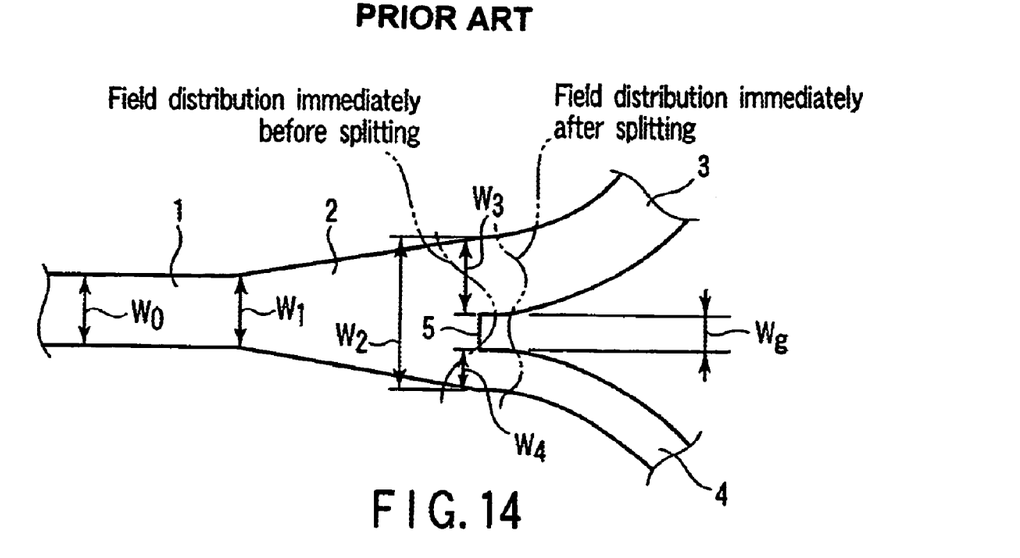
FIG. 14 is a plan view showing a prior art optical splitter.

For example, a prior art optical splitter as shown in FIG. 14 has a main waveguide 1, a tapered waveguide 2, and a pair of split waveguides 3 and 4. The widths $W_3$ and $W_4$ of the split waveguides 3 and 4 are caused to differ from each other to allow optical power to be split asymmetrically. The tapered waveguide 2 tapers and expands from the main waveguide 1 toward the split waveguides 3 and 4, i.e., from width $W_1$ to width $W_2$. A split portion end face 5 of width Wg is formed between the split waveguides 3 and 4.

In the prior art optical splitter shown in FIG. 14, the width $W_2$ of the tapered waveguide 2 at the connecting portions of the tapered waveguide 2 and the split waveguides 3 and 4 is equal to the sum of the widths $W_3$ and $W_4$ of the split waveguides 3 and 4 and the width Wg of the split end face 5. In other words, the optical splitter is designed to have the following relationships: $W_2=(W_3+W_4+W_g)$ and $W_3 \neq W_4$.

Figure 15:
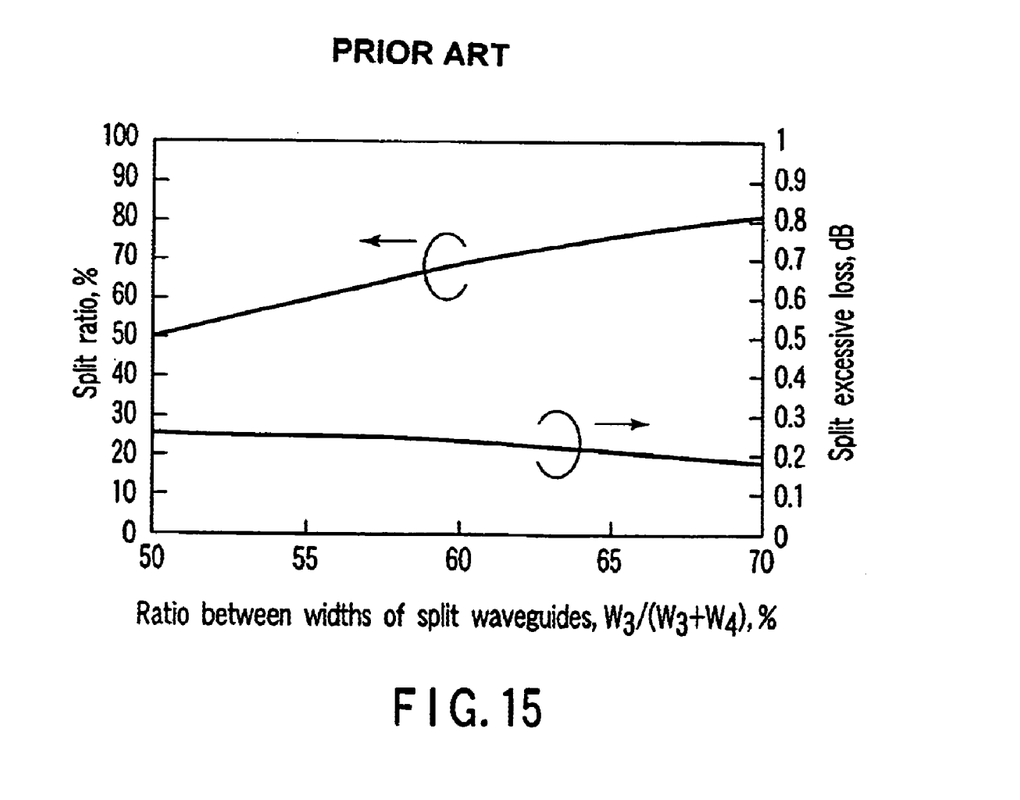
FIG. 15 is a graph showing a relationship between a ratio between the widths of split waveguides and each of a split ratio and a split excessive loss in the optical splitter shown in FIG. 14.

FIG. 15 shows a relationship between a ratio between the widths $W_3$ and $W_4$ of the split waveguides 3 and 4 and each of a split ratio and a split excessive loss in the prior art optical splitter shown in FIG. 14. In FIG. 15, the horizontal axis represents a ratio between the widths $W_3$ and $W_4$ of the split waveguides 3 and 4 [$W_3/(W_3+W_4)$]. The left vertical axis represents a split ratio between the split waveguides 3 and 4, and the right vertical axis represents a split excessive loss. The sum of the widths $W_3$ and $W_4$ of the split waveguides 3 and 4 is 10 μm, and the section of the main waveguide 1 is a 7 μm×7 μm square. The relative refractive index difference between a core and a clad layer is 0.45%, the width Wg of the split portion end face 5 is 3 μm, the length of the tapered waveguide 2 is 600 μm, and the wavelength of an optical signal is 1.55 μm.

Figure 16:
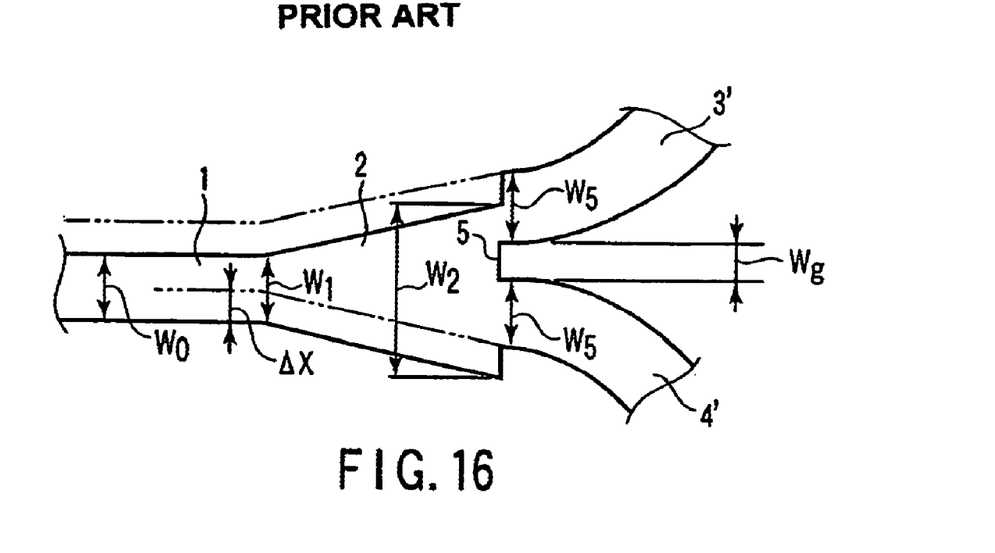
FIG. 16 is a plan view of another prior art optical splitter.

On the other hand, Jpn. Pat. Appln. KOKAI Publication No. 9-80244 describes an optical splitter wherein the positions of a pair of split waveguides are displaced in a width direction of a tapered waveguide. This prior art is directed to an optical splitter as shown in FIG. 16. The optical splitter has a pair of split waveguides 3' and 4' whose widths $W_S$ are equal to each other, and the central axes of the split waveguides 3' and 4' are displaced by ΔX in the width direction of a tapered waveguide 2 from the central axes of the main waveguide 1 and tapered waveguide 2.

Figure 17:
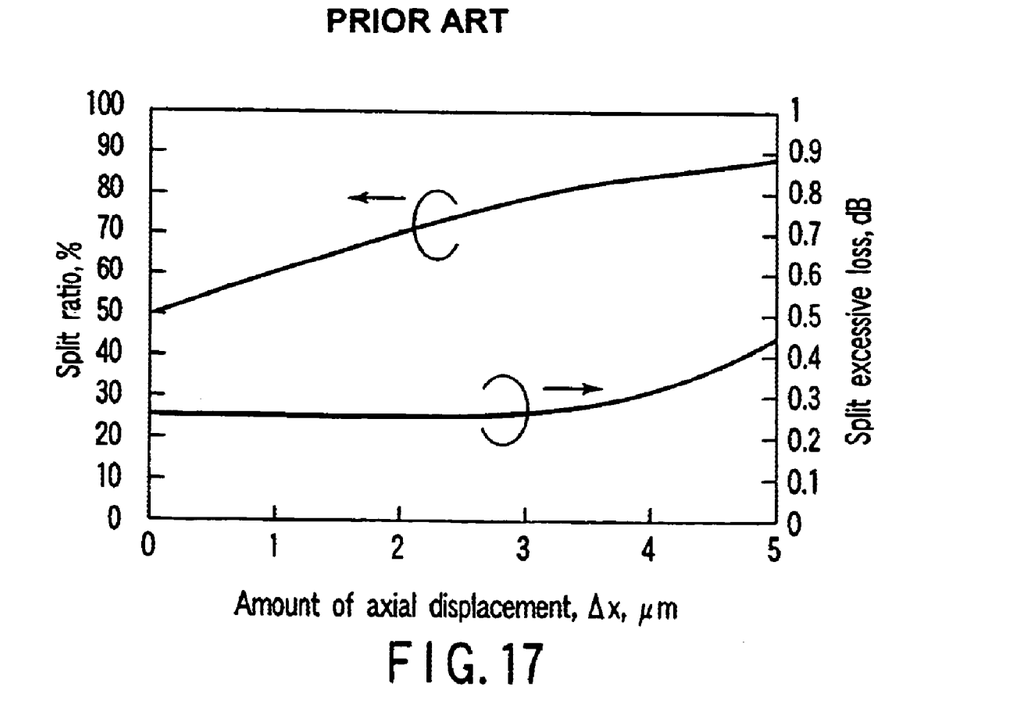
FIG. 17 is a graph showing a relationship between an amount of axial displacement and each of a split ratio and a split excessive loss in the optical splitter shown in FIG. 16.

FIG. 17 shows a relationship between the amount of axial displacement ΔX and each of a split ratio and a split excessive loss in the prior art optical splitter shown in FIG. 16. In FIG. 17, the horizontal axis represents the amount of axial displacement ΔX. The left vertical axis represents the split ratio between the split waveguides 3' and 4', and the right vertical axis represents the split excessive loss. The section of each of the main waveguide 1 and split waveguides 3' and 4' is a 7 μm×7 μm rectangle. The relative refractive index difference between a core and a clad layer is 0.45%, the width Wg of a split portion end face 5 is 3 μm, the length of the tapered waveguide 2 is 600 μm, and the wavelength of an optical signal is 1.55 μm.

The prior art optical splitter shown in FIG. 14 has the drawback that the split excessive loss is as high as about 0.2 dB over the full range of 50 percent to 80-odd percent of split ratio as shown in FIG. 15.

In contrast, the prior art optical splitter shown in FIG. 16 has the drawback that the split excessive loss becomes high as the split ratio increases as shown in FIG. 17. For this reason, there is a limit to the increase in the split ratio.

BRIEF SUMMARY OF THE INVENTION

An object of the present invention is to provide an optical splitter capable of decreasing a loss and increasing a split ratio.

An optical splitter according to the present invention comprises a main waveguide, a tapered waveguide having a first end portion connected to the main waveguide and side portions that taper and expand from the first end portion toward second end portions, and a split waveguide group including first and second split waveguides connected to the second end portions of the tapered waveguide, wherein the first and second split waveguides connected to the second end portions have respective incident ends whose widths differ from each other, a whole width of the split waveguide group is smaller than a width of the second end portions, and step portions are formed between the split waveguide group and the side portions of the tapered waveguide. With this configuration, the loss is lowered and the split ratio can be varied over a wide range.

In a preferred embodiment of the present invention, an expanding portion is formed at the first end portion of the tapered waveguide, and one side of the expanding portion expands toward one side portion of the tapered waveguide more greatly than the other side thereof. With this configuration, the peak of the field distribution of light beams can be displaced toward a broader split waveguide.

In this invention, the incident end of a broader one of the first and second split waveguides is disposed in which direction a light beam meanders in the tapered waveguide. With this configuration, the split ratio can be varied further over a wide range.

In a preferred embodiment of the present invention, the length of the tapered waveguide is set to a value close to an extreme taken by an amount of meandering of light beams, and a broader one of the split waveguides is arranged within a range of ±100 μm in the width direction of the tapered waveguide, the center of the range corresponding to a position in which the amount of meandering of light beams takes an extreme. With this configuration, the split ratio can be increased further.

DETAILED DESCRIPTION OF THE INVENTION

A first embodiment of the present invention will be described below with reference to FIGS. 1 to 4.

Figure 1:
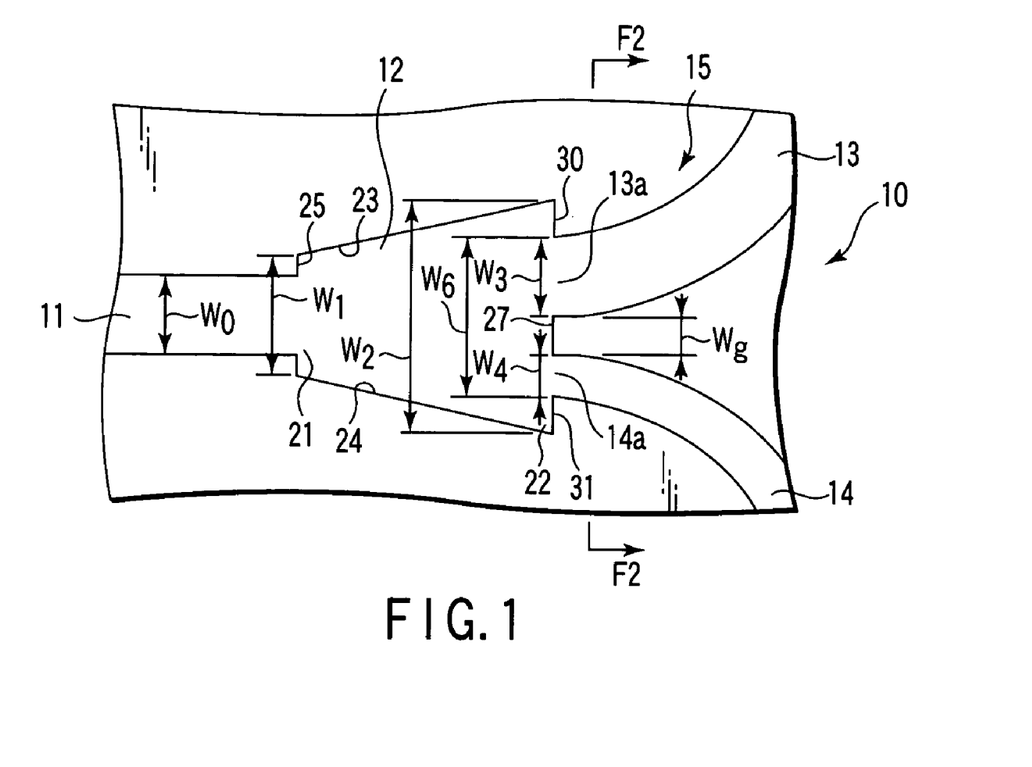
FIG. 1 is a plan view of an optical splitter according to a first embodiment of the present invention.

An optical splitter 10 shown in FIG. 1 includes a main waveguide 11, a tapered waveguide 12, and a split waveguide group 15 having two split waveguides 13 and 14.

Figure 2:
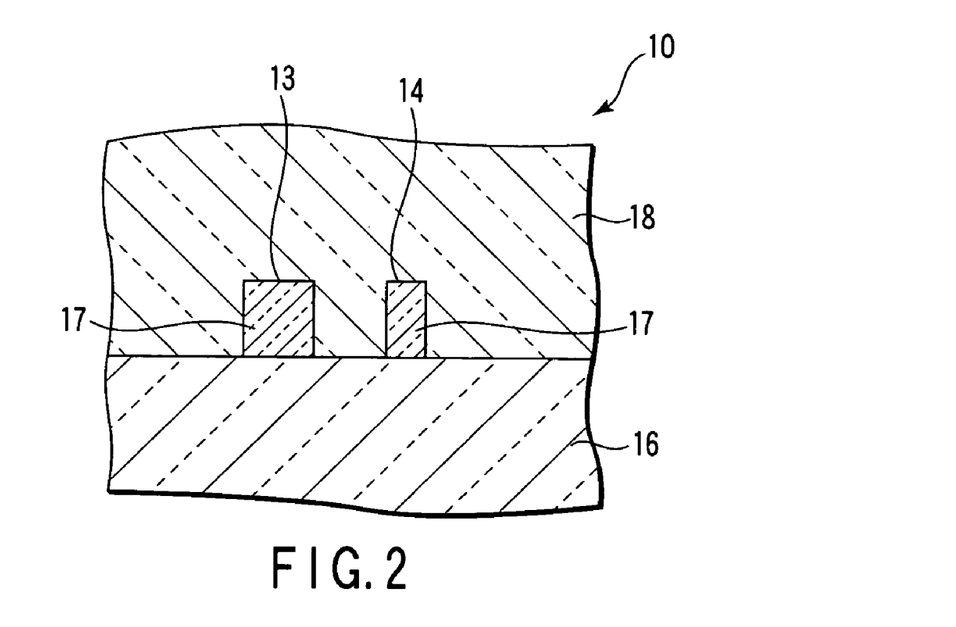
FIG. 2 is a sectional view of the optical splitter taken along line F2—F2 in FIG. 1.

As is seen from FIG. 2 showing a section of part of the optical splitter 10, the main waveguide 11, tapered waveguide 12, and split waveguides 13 and 14 are formed by cores 17 and a clad layer 18 formed on a substrate 16.

The tapered waveguide 12 has a first end portion 21 corresponding to a connecting portion between the tapered waveguide 12 and the main waveguide 11. The tapered waveguide 12 also has second end portions 22 corresponding to connecting portions between the tapered waveguide 12 and the split waveguides 13 and 14. Further, the tapered waveguide 12 has side portions 23 and 24 that taper and expand from the first end portion 21 toward the second end portions 22. In other words, the tapered waveguide 12 tapers and its width increases from $W_1$ to $W_2$ from the first end portion 21 toward the second end portions 22.

The width $W_1$ of the tapered waveguide 12 at the first end portion 21 is greater than the width $W_0$ of the main waveguide 11. Thus, a step-like expanding portion 25 is formed at the first end portion 21 corresponding to a connecting portion between the main waveguide 11 and the tapered waveguide 12.

The first and second split waveguides 13 and 14 have their respective incident ends 13a and 14a that are connected to the second end portions 22 of the tapered waveguide 12. The widths $W_3$ and $W_4$ of the incident ends 13a and 14a are different from each other. For example, the width $W_3$ of the incident end 13a of the first split waveguide 13 is greater than the width $W_4$ of the incident end 14a of the second split waveguide 14. A split portion end face 27 having a width Wg is formed between the split waveguides 13 and 14.

In the optical splitter 10, the whole width $W_6$ of the split waveguide group 15 is smaller than the width $W_2$ of the tapered waveguide 12 at the second end portions 22. For this reason, a step portion 30 is formed between the side portion 23 of the tapered waveguide 12 and the incident end 13a of the split waveguide 13, and a step portion 31 is formed between the side portion 24 of the tapered waveguide 12 and the incident end 14a of the split waveguide 14.

The width $W_6$ of the split waveguide group 15 is a dimension corresponding to the sum of the widths $W_3$ and $W_4$ of the split waveguides 13 and 14 and the width Wg of the split portion end face 27. That is, the following relationship is given: $W_2 > (W_3 + W_4 + Wg)$. The optical splitter 10 is designed to satisfy the relationship $W_3 \neq W_4$.

Figure 3:
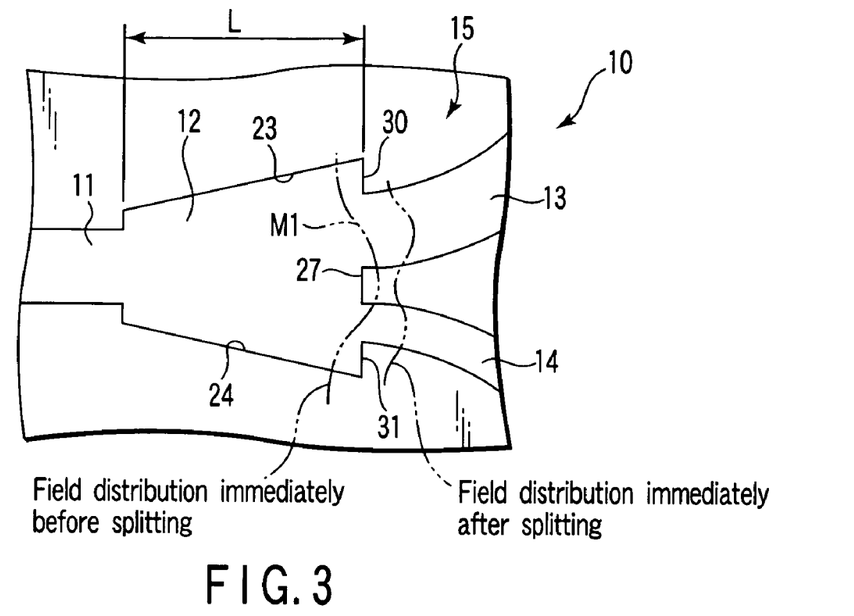
FIG. 3 is a plan view of the optical splitter shown in FIG. 1, showing variations in field distribution appearing immediately before and after splitting.

Since the step portions 30 and 31 are formed, a field distribution indicated by M1 in FIG. 3 is formed at the connecting portions (second end portions 22) between the main waveguide 11 and the split waveguides 13 and 14. In other words, an analogue to the field distribution of light beams can be propagated to the split waveguides 13 and 14 without being deformed as much as possible immediately before and after splitting. Consequently, the split excessive loss can be made smaller than that of the prior art optical splitter (shown in FIG. 14).

Figure 4:
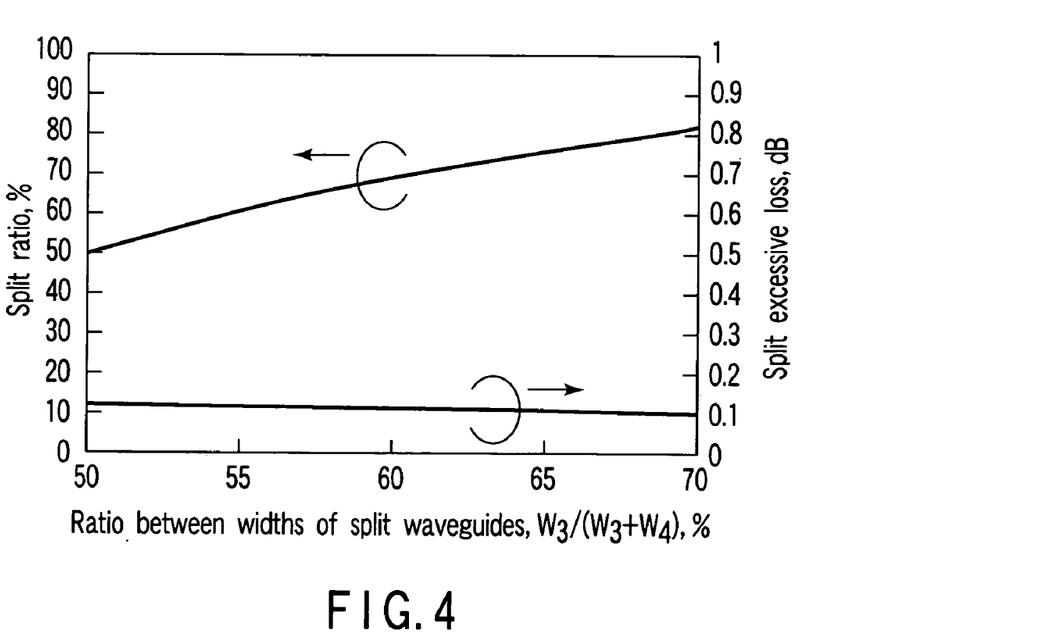
FIG. 4 is a graph showing a relationship between a ratio between the widths of split waveguides and each of a split ratio and a split excessive loss in the optical splitter shown in FIG. 1.

FIG. 4 shows a relationship between the ratio between the widths $W_3$ and $W_4$ of the split waveguides 13 and 14 and each of the split ratio and the split excessive loss in the optical splitter 10 according to the first embodiment. In FIG. 4, the horizontal axis represents the ratio between the widths $W_3$ and $W_4$ $[W_3/(W_3+W_4)]$ of the split waveguides 13 and 14. The left vertical axis represents the split ratio between the split waveguides 13 and 14, and the right vertical axis represents the split excessive loss.

The sum of the widths $W_3$ and $W_4$ of the split waveguides 13 and 14 is 10 µm, and the section of the main waveguide 11 is a 7 µm×7 µm square. The relative refractive index difference between each of the cores 17 and the clad layer 18 is 0.45%, and the width Wg of the split portion end face 27 is 3 µm. The length L of the tapered waveguide 12 is 600 µm, and the wavelength of an optical signal is 1.55 µm.

The width $W_2$ of the tapered waveguide 12 at the second end portions 22 is optimized in accordance with a desired split ratio. When the split ratio is 67:33 as one example, the width $W_2$ is set to 17 µm. In this case, the width of each of the step portions 30 and 31 is 2 µm.

It is desirable that the width $W_1$ of the tapered waveguide 12 at the first end portion 21 be equal to or slightly greater than the width $W_0$ of the main waveguide 11 to decrease a loss at the connecting portion between the main waveguide 11 and the tapered waveguide 12.

According to the optical splitter 10 of the first embodiment, as shown in FIG. 4, the split excessive loss is maintained at a fixed, low value of about 0.1 dB over a wide range of split ratio (50% to 82%). This optical splitter 10 can reduce the split excessive loss to nearly half as compared with the prior art optical splitter (shown in FIG. 14).

Figure 5:
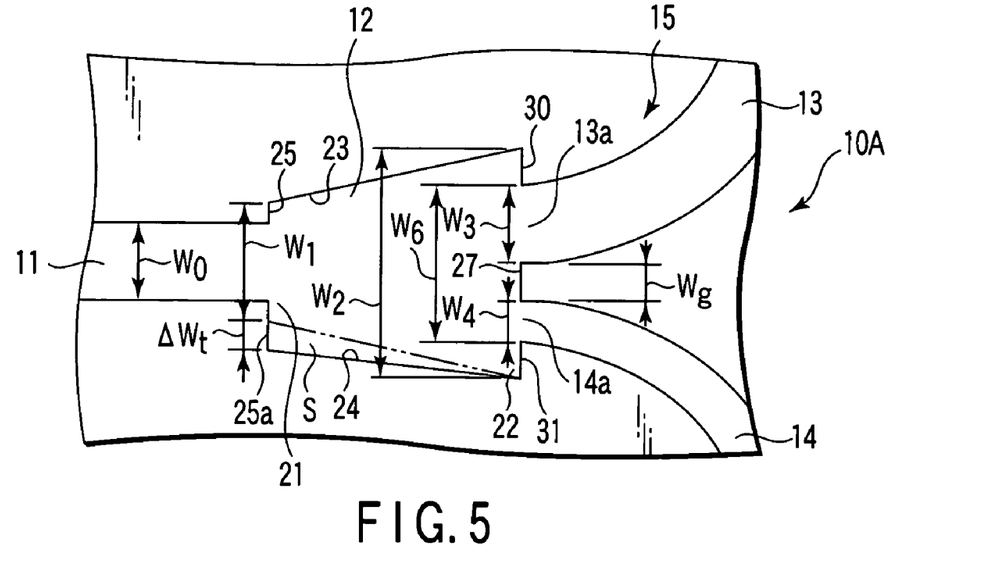
FIG. 5 is a plan view of an optical splitter according to a second embodiment of the present invention.
Figure 6:
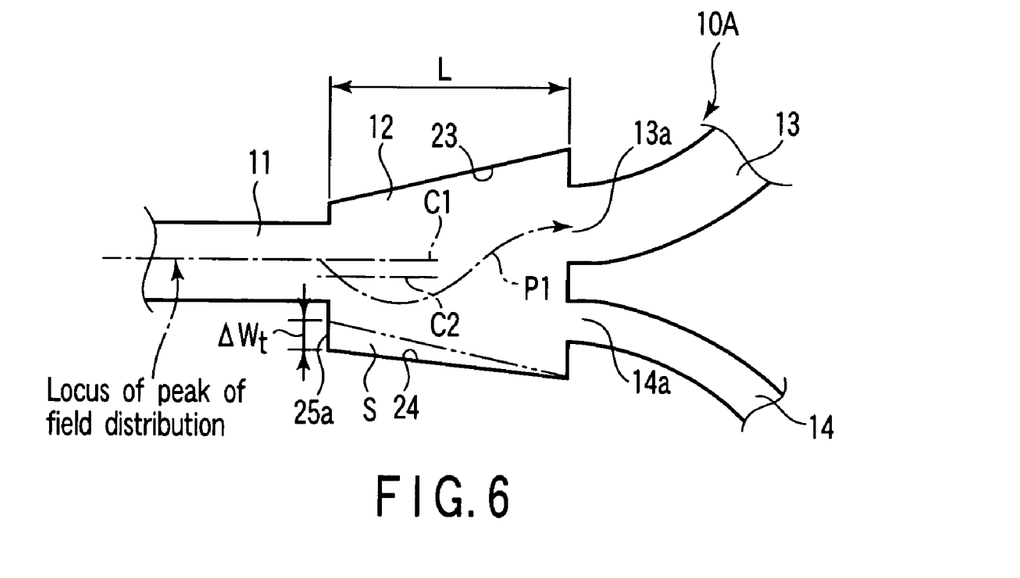
FIG. 6 is a plan view of the optical splitter shown in FIG. 5, showing a meandering peak of the field distribution.

FIGS. 5 and 6 show an optical splitter 10A according to a second embodiment of the present invention. The optical splitter 10A also includes one main waveguide 11, a tapered waveguide 12, and a split waveguide group 15 having a pair of split waveguides 13 and 14. The tapered waveguide 12 of the optical splitter 10A has a region S that is formed by further expanding the tapered waveguide 12 toward one side (one side portion 24) by $\Delta Wt$.

In other words, an expanding portion 25a is formed at a first end portion 21 of the tapered waveguide 12 by expanding one side of the tapered waveguide 12 toward the one side portion 24 more than the other side thereof. Thus, the central axis C2 of the tapered waveguide 12 is displaced from the central axis C1 of the main waveguide 11 in the width direction of the tapered waveguide 12. Since the other configurations of the optical splitter 10A are the same as those of the optical splitter 10 according to the first embodiment, the same components as those of the first embodiment are denoted by the same reference numerals and their descriptions are omitted.

In the optical splitter 10A according to the second embodiment, the expanding portion 25a is formed on one side of the tapered waveguide 12 and the central axis C2 of the tapered waveguide 12 is displaced from the central axis C1 of the main waveguide 11. The peak of a field distribution therefore meanders as indicated by P1 in FIG. 6. In other words, the peak of the field distribution of light beams applied to the tapered waveguide 12 from the main waveguide 11 moves toward one side portion 24 of the tapered waveguide 12 and then toward the other side portion 23. Thus, the peak of the field distribution meanders with reference to the central axis C2 of the tapered waveguide 12.

In the optical splitter 10A, the broader split waveguide 13 has an incident end 13a that is disposed in which direction the peak of the field distribution meanders. With this configuration, the peak of the field distribution can be displaced toward the broader split waveguide 13 at connecting portions between the tapered waveguide 12 and the split waveguides 13 and 14. The split ratio of the optical splitter 10A can thus be set much greater than that of the optical splitter 10 according to the first embodiment.

Figure 7:
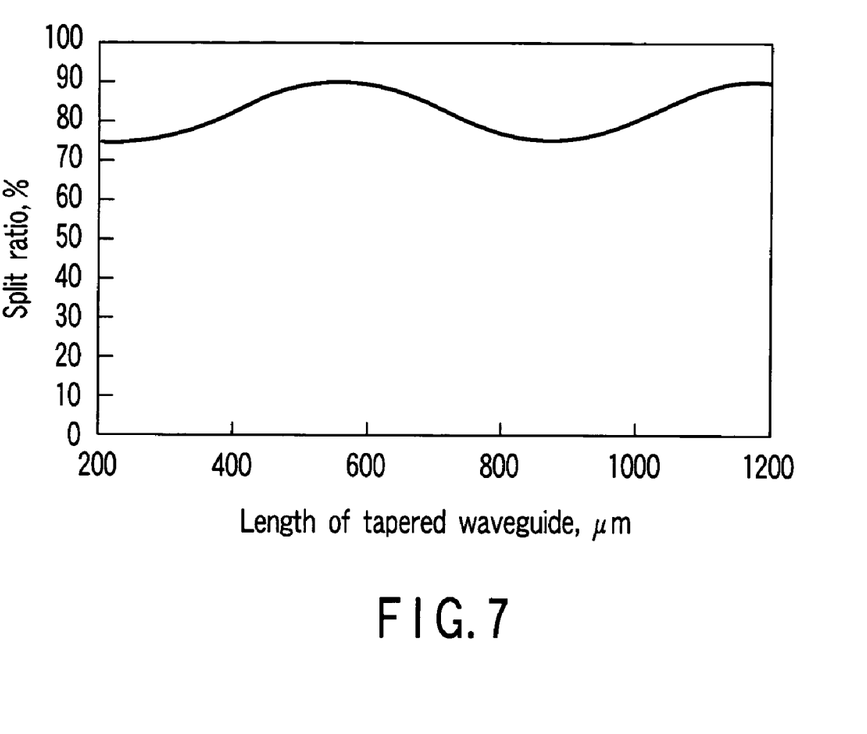
FIG. 7 is a graph showing a relationship between the length of a tapered waveguide and the split ratio in the optical splitter shown in FIG. 5.

FIG. 7 shows a relationship between the length L of the tapered waveguide 12 and the split ratio in the optical splitter 10A. The width $W_3$ of the first split waveguide 13 is 7 µm, and the width $W_4$ of the second split waveguide 14 is 3 µm. The section of the main waveguide 11 is a 7 µm×7 µm square. The width Wg of a split portion end face 27 is 3 µm, the relative refractive index difference is 0.45%, and the wavelength of an optical signal is 1.55 µm. The width $W_2$ of the tapered waveguide 12 at the second end portions 22 is 16 µm, and an amount $\Delta Wt$ of expansion of one side of the tapered waveguide 12 is 1 µm.

As shown in FIG. 7, the maximum value and the minimum value appear alternately at the split ratio in accordance with the length L of the tapered waveguide 12. This is because the peak of the field distribution meanders in the tapered waveguide 12.

Figure 8:
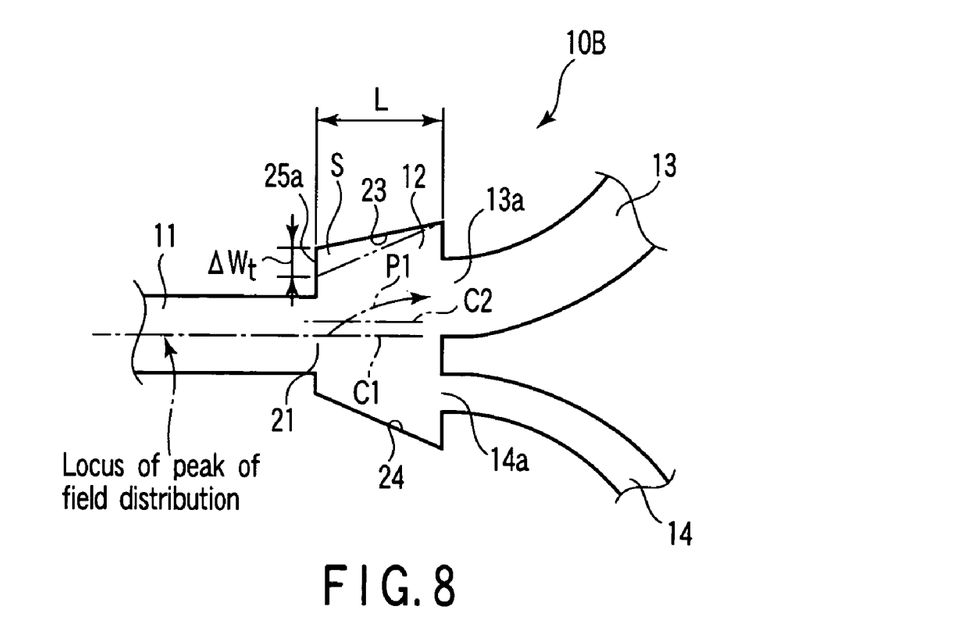
FIG. 8 is a plan view of an optical splitter according to a third embodiment of the present invention.

FIG. 8 shows an optical waveguide 10B according to a third embodiment of the present invention. A tapered waveguide 12 of this embodiment has a region S that is formed by further expanding the tapered waveguide 12 toward the other side portion 23 by $\Delta Wt$. In other words, an expanding portion 25a is formed at a first end portion 21 of the tapered waveguide 12 by expanding one side of the tapered waveguide 12 toward the one side portion 23 more than the other side thereof. Thus, the central axis C2 of the tapered waveguide 12 is displaced in the direction of the other side portion 23 from the central axis C1 of the main waveguide 11.

In the optical splitter 10B, the peak of the field distribution of light beams applied to the tapered waveguide 12 from the main waveguide 11 moves toward the other side portion 23 as indicated by P1. Since, therefore, the broader split waveguide 13 is arranged in this direction, the split ratio can be increased further than that of the optical splitter 10 according to the first embodiment.

Figure 9:
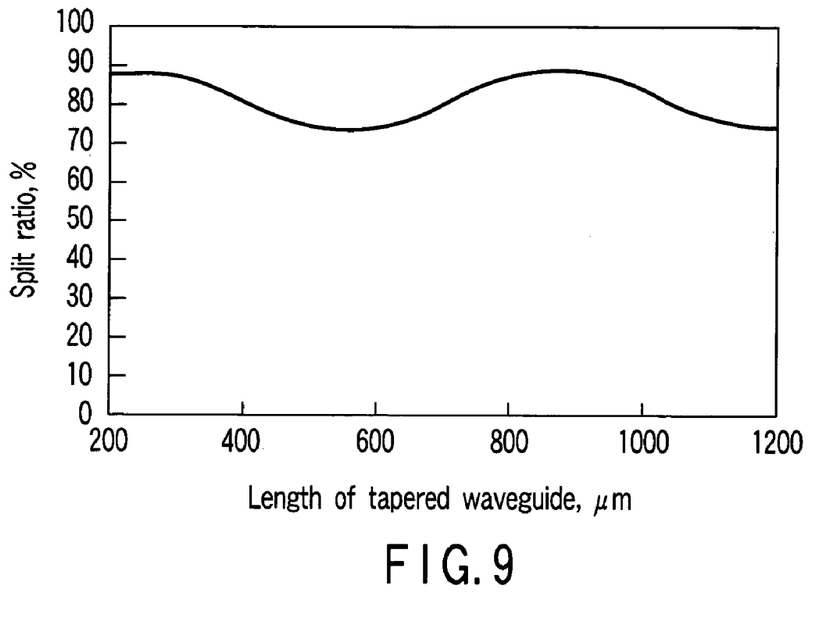
FIG. 9 is a graph showing a relationship between the length of a tapered waveguide and the split ratio in the optical splitter shown in FIG. 8.

FIG. 9 shows a relationship between the length L of the tapered waveguide 12 and the split ratio in the optical splitter 10B. As shown in FIG. 9, the maximum value and the minimum value appear alternately at the split ratio in accordance with the length L of the tapered waveguide 12. This is because the peak of the field distribution meanders in the tapered waveguide 12.

Figure 10:
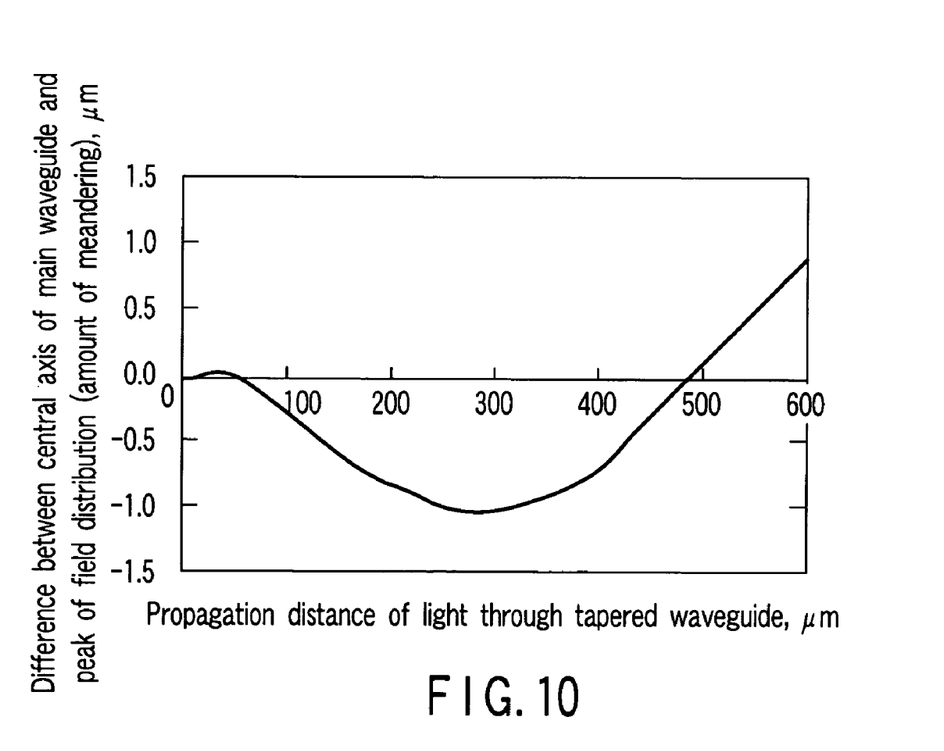
FIG. 10 is a graph showing a relationship between a propagation distance of light beams propagating through the tapered waveguide and an amount of meandering of light beams in the optical splitter shown in FIG. 8.

FIG. 10 shows results of analysis on how the peak of the field distribution meanders when the length L of the tapered waveguide 12 is fixed to 600 µm in the optical splitter 10B shown in FIG. 8. In FIG. 10, the horizontal axis represents a propagation distance of light beams through the tapered waveguide 12, and the vertical axis represents an amount of meandering, or a difference between the central axis C1 of the main waveguide 11 and the position of the peak of the field distribution.

Figure 11:
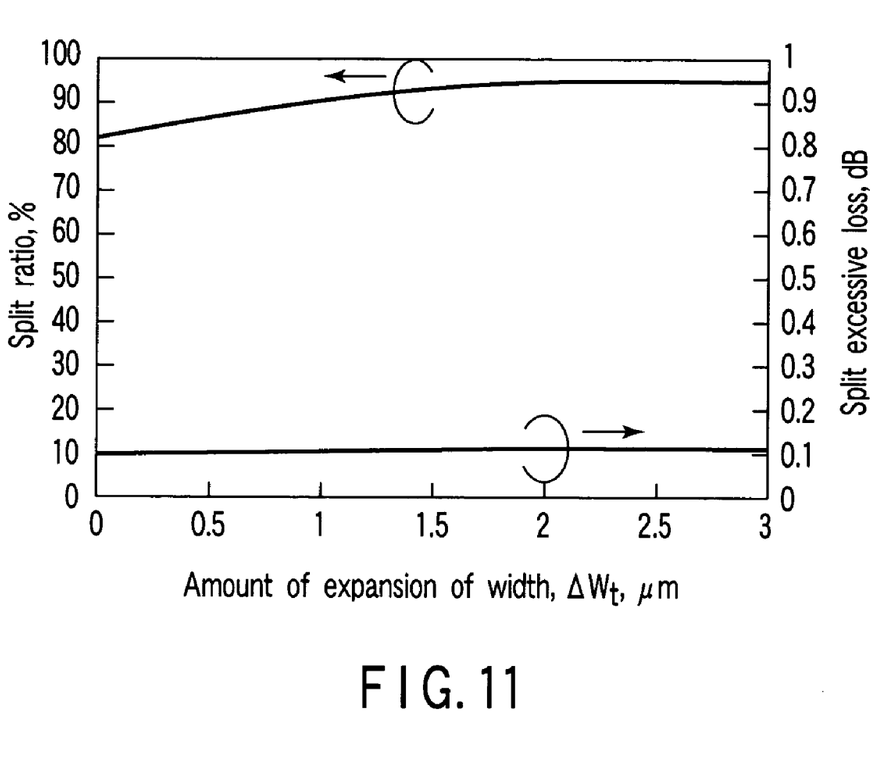
FIG. 11 is a graph showing a relationship between an amount of extension of one side of the tapered waveguide and each of the split ratio and the split excessive loss in the optical splitter shown in FIG. 8.

FIG. 11 shows variations in split ratio and split excessive loss when the amount $\Delta Wt$ of expansion of one side is varied in the optical splitter 10B shown in FIG. 8. In FIG. 11, the horizontal axis represents the amount $\Delta Wt$ of expansion, the left vertical axis represents the split ratio, and the right vertical axis represents the split excessive loss.

As described above, in the optical splitters 10A and 10B according to the second and third embodiments, the split ratio depends on the length L of the tapered waveguide 12 and has periodicity. In other words, when the split ratio increases, a displacement between the central axis C1 of the main waveguide 11 and the peak of the field distribution (an amount of meandering) becomes large.

Therefore, the split ratio can efficiently be increased if the length L of the tapered waveguide 12 is determined such that the amount of meandering of light beams takes an extreme and the incident end 13a of the broader split waveguide 13 is disposed in which direction the light beams meander. In other words, the split ratio can be increased the most efficiently if the incident end 13a of the broader split waveguide 13 is disposed in which position the meandering light beams have an extreme. However, the position of the incident end 13a can slightly be displaced, and practically the displacement can be allowed within a range of ±100 µm.

As for the loss, like the optical splitter 10 according to the first embodiment, the optical splitters 10A and 10B can split light beams without deforming an analog to a mode at the connecting portions between the tapered waveguide 12 and the split waveguides 13 and 14, as compared with the prior art optical splitter. In the optical splitters 10A and 10B according to the second and third embodiments, too, the split ratio can be varied over a wide range while maintaining a small split excessive loss.

If the amount $\Delta Wt$ of expansion of one side is 0 in the optical splitters 10A and 10B, these optical splitters correspond to the optical splitter 10 according to the first embodiment. The dimensions of the respective components in the first embodiment are close to the limitation that allows the optical splitter 10 to be manufactured with stability. It is thus difficult to achieve a split ratio that exceeds 80% in the first embodiment.

If, therefore, an optical splitter is configured like the optical splitters 10A and 10B according to the second and third embodiments, the split ratio can be increased further in accordance with the amount ΔWt of expansion while keeping the split excessive loss at an almost fixed, low value.

Consequently, the optical splitters 10A and 10B of the second and third embodiments can be applied when the optical splitter 10 of the first embodiment cannot increase the split ratio any more for manufacturing reasons and the like but requires a further large split ratio.

Figure 12:
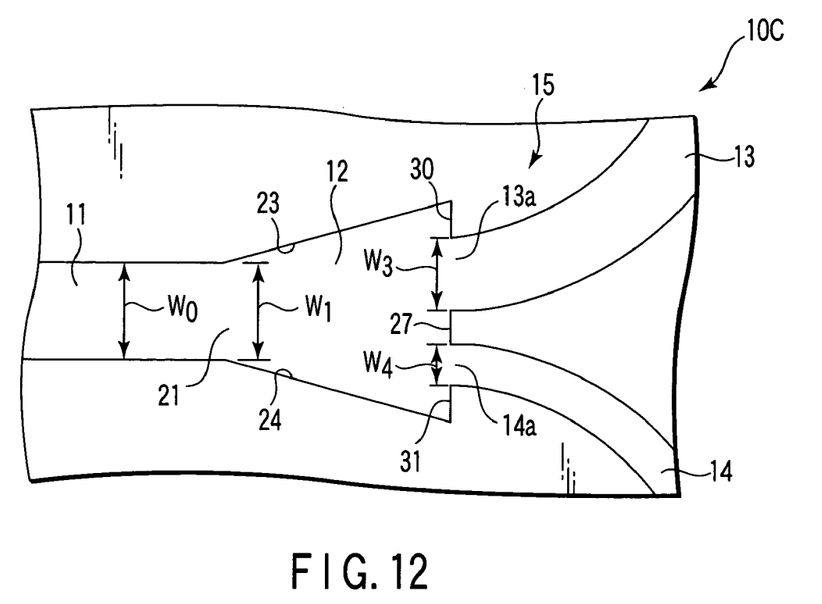
FIG. 12 is a plan view of an optical splitter according to a fourth embodiment of the present invention.

FIG. 12 shows an optical splitter 10C according to a fourth embodiment of the present invention. In this optical splitter 10C, the width $W_0$ of the main waveguide 11 and the width $W_1$ of the tapered waveguide 12 at the first end portion 21 are substantially the same. In other words, the main waveguide 11 and tapered waveguide 12 continue with each other without forming the expanding portions 25 and 25a as in the respective embodiments described above. Except for this, the optical splitter 10C is configured in the same manner as the optical splitter 10 according to the first embodiment. Like the optical splitters 10A and 10B of the second and third embodiments, the optical splitter 10C can adopt a tapered waveguide 12 one side of which expands by ΔWt.

Figure 13:
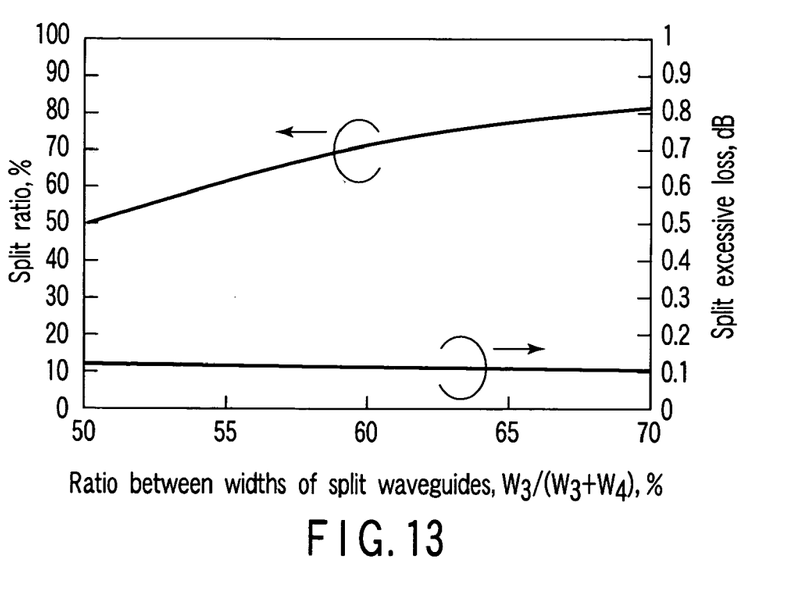
FIG. 13 is a graph showing a relationship between a ratio between the widths of split waveguides and each of a split ratio and a split excessive loss in the optical splitter shown in FIG. 12.

FIG. 13 shows a relationship between a ratio between widths $W_3$ and $W_4$ of the split waveguides 13 and 14 and each of the split ratio and the split excessive loss in the optical splitter 10C of the fourth embodiment. As shown in FIG. 13, the optical splitter 10C of the fourth embodiment allows the split excessive loss to be set at a low value of about 0.1% over a wide range of the split ratio.

As described above, the central axes of the main waveguide 11, tapered waveguide 12, and split waveguides 13 and 14 can be aligned with one another or displaced from one another. When the central axes are displaced, the degree of freedom to design an optical splitter becomes higher than that in the case where they are aligned.

In the respective embodiments described above, the main waveguide 11 and the side portions 23 and 24 of the tapered waveguide 12 are linearly formed, however, they can be curved like an arc, a sin curve, etc. The split waveguide group 15 can be formed of two or more split waveguides 13 and 14.

The optical splitter of the present invention can be applied to, for example, a device that splits a signal light beam in optical communications and the like.

What is claimed is:

1. An optical splitter having cores and a clad layer that covers the cores, comprising:
    a main waveguide;
    a tapered waveguide having a first end portion connected to the main waveguide and side portions that taper and expand from the first end portion toward second end portions; and
    a split waveguide group including first and second split waveguides connected to the second end portions of the tapered waveguide, wherein the first and second split waveguides connected to the second end portions have respective incident ends whose widths differ from each other, a whole width of the split waveguide group is smaller than a width of the tapered waveguide at the second end portions, and step portions are formed between the split waveguide group and the side portions of the tapered waveguide, and
    wherein an expanding portion is formed at the first end portion of the tapered waveguide, one side of the expanding portion expanding toward one of the side portions of the tapered waveguide more greatly than other side thereof.

2. The optical splitter according to claim 1, wherein the incident end of a broader one of the first and second split waveguides is disposed in a meandering direction of light beams applied to the tapered waveguide from the main waveguide.

3. The optical splitter according to claim 2, wherein a length of the tapered waveguide is set to a value close to an extreme taken by an amount of meandering of the light beams.

4. An optical splitter having cores and a clad layer that covers the cores, comprising:
    a main waveguide;
    a split waveguide group including first and second split waveguides; and
    a tapered waveguide having a first end connected to said main waveguide and a second end connected to said split waveguide group,
    wherein said tapered waveguide has a first side and a second side, said first and second sides expanding linearly from said first end toward said second end, said tapered waveguide has a first expanded portion between said main waveguide and said first side and a second expanded portion between said main waveguide and said second side, said first expanded portion being larger than said second expanded portion, and
    wherein said first and second split waveguides have respective incident ends whose widths differ from each other, said second end having a width that is larger than a whole width of said split waveguide group so that step portions are formed between said split waveguide group and said first and second sides.

5. The optical splitter according to claim 4, wherein said incident end of a broader one of the first and second split waveguides is in a meandering direction of light beams applied to said tapered waveguide from said main waveguide.

6. The optical splitter according to claim 5, wherein said tapered waveguide has a length set to a value close to an extreme taken by an amount of meandering of the light beams.

* * * * *